United States Patent [19]

Fullerton

[11] E Re. 29,612

[45] Reissued Apr. 18, 1978

[54] MACHINE TOOL WITH INDEXIBLE TOOL SUPPORT

[75] Inventor: Baxter T. Fullerton, Cleveland, Ohio

[73] Assignee: The Warner & Swasey Company, Cleveland, Ohio

[21] Appl. No.: 723,308

[22] Filed: Sep. 14, 1976

Related U.S. Patent Documents

Reissue of:

[64] Patent No.: 3,835,516
Issued: Sep. 17, 1974
Appl. No.: 292,982
Filed: Sep. 28, 1972

U.S. Applications:

[63] Continuation-in-part of Ser. No. 148,729, Jun. 1, 1971, abandoned.

[51] Int. Cl.[2] ..... B23B 3/18
[52] U.S. Cl. ..... 29/47; 82/36 A
[58] Field of Search ..... 29/27 R, 47, 27 C, 43; 82/2 R, 2 D, 32, 36 A

[56] References Cited

U.S. PATENT DOCUMENTS

| | | | |
|---|---|---|---|
| 683,592 | 10/1901 | Bullard | 82/2 D |
| 2,368,736 | 2/1945 | Wyrick | 82/36 A |
| 2,534,333 | 12/1950 | Wyrick | 82/36 A |
| 3,124,985 | 3/1964 | Curtis et al. | 82/2 R |
| 3,423,812 | 1/1969 | Spur | 29/27 C X |
| 3,643,307 | 2/1972 | Ledergerber et al. | 29/47 X |

FOREIGN PATENT DOCUMENTS

| | | | |
|---|---|---|---|
| 1,101,047 | 1/1968 | United Kingdom | 82/2 D |

*Primary Examiner*—Othell M. Simpson
*Assistant Examiner*—Z. R. Bilinsky

[57] ABSTRACT

A machine tool comprising a headstock having a rotatable spindle for supporting and rotating a workpiece. A turret mounted on the headstock and offset to one side of the spindle carries tools to work upon a workpiece in the spindle. Bearing means offset to one side of the spindle supports the turret for indexing movement about and feed movement along an axis parallel to the spindle axis and second bearing means extending to one side of the spindle housing on the machine bed supports the first bearing means and the turret for movement toward and away from the spindle axis. The bed of the machine does not project substantially beyond the spindle housing in the direction of the spindle axis and the turret projects outwardly of the bed. The turret is movable along the axis of rotation thereof a variable distance depending upon the work to be performed.

20 Claims, 17 Drawing Figures

MACHINE TOOL WITH INDEXIBLE TOOL SUPPORT

Matter enclosed in heavy brackets [ ] appears in the original patent but forms no part of this reissue specification; matter printed in italics indicates the additions made by reissue.

This application is a continuation-in-part of my copending application Ser. No. 148,729 filed June 1, 1971, and now abandoned and is assigned to the same assignee as that application.

The present invention is directed to an improved machine tool of the type disclosed in U.S. Pat. No. 2,644,222 issued to Myron S. Curtis. IIn the type of machine tool disclosed in that patent, a tool supporting turret is supported from the headstock of the machine to extend longitudinally along a workpiece chucked on a rotatable spindle. The turret is indexible about an axis parallel to the spindle axis to index tools on different faces thereof in working relationship with the workpiece supported in the spindle and is movable axially of its axis of rotation to move a tool through a work stroke.

In the machine of the aforesaid patent, the tools on the turret are mounted different distances from the supporting surface to properly position the tool relative to the spindle axis to establish the proper machining relationship between the tool and the workpiece. When a turning tool is working adjacent the spindle axis, the support for the tool is a relatively long cantilevered support and must be constructed to provide the necessary rigidity.

The tool must also be remounted if the depth of cut or working position of the tool relative to the workpiece is to be changed. This means that machine down time is increased if there is to be such a change. Moreover, this requires resetting tools to machine workpieces of the same configuration but of different size.

In addition to the foregoing, construction of the machine of the patent is such that the tools move through the same stroke regardless of the length of cut so that lost machine time will occur when the tools on the different surfaces of the tool turret require different work strokes. This also requires the tools to be mounted with their working edges in different positions relative to the axial length of the turret to position the tool to cut metal for only the desired length of the stroke of the turret.

The present invention contemplates the provision of a new and improved machine tool with improved efficiency of operation.

The present invention provides a new and improved machine tool in which an indexible turret is indexible about an axis extending parallel to the spindle axis and disposed to one side of the spindle axis is supported for movement toward and away from the spindle axis by ways which are located adjacent the spindle head and to one side thereof and which extend transversely of the spindle axis.

The present invention also provides a new and improved machine tool of the type described in the aforementioned patent in which the set-up time necessary to change the relative working position of the tool on the indexible turret is minimized.

The present invention is also directed to a new and improved machine tool in which bearing means for supporting the indexible turret alongside of the spindle axis for feed movement and indexing about an axis parallel to the spindle axis is in turn supported for movement toward and away from the spindle axis by ways extending transversely of the spindle axis.

Additionally, the present invention provides a new and improved machine tool in which the bed of the machine tool does not extend appreciably axially outwardly from the machine tool spindle and in which an indexible tool-supporting turret which is indexible about an axis parallel to the spindle axis is supported to one side of the spindle axis by ways formed on the bed adjacent the spindle housing so as to extend from adjacent the spindle housing rearwardly of the machine and transversely of the spindle axis.

The present invention also provides an improved machine in that inaccuracies due to unnecessary turret travel to position the tool are minimized by the provision of a variable length work stroke for the turret axially of the workpiece and a plurality of positions along a turret face for mounting tools.

The present invention also has the advantage of minimizing the number of tools required to perform the same type of machining operations for different lengths or at different locations on the workpiece.

Still further, the present invention is directed to a new and improved machine tool of the type described in which the machine is so constructed and arranged that an operator has easy access to the spindle chuck for positioning workpieces in the spindle chuck and to the indexible turret for setting up and mounting tools and in which the turret is movable toward and away from the axis of the spindle.

A still further provision of the present invention is a new and improved machine tool having a rotatable spindle in which a workpiece is chucked for machining and an indexible turret adjacent the spindle axis is indexible about an axis parallel to the spindle axis with the machine being so constructed and arranged that the indexible turret may be moved transversely of the spindle axis to move the tool on the turret toward and away from the spindle axis with the turret being supported for its transverse movement in such a manner that the bed of the machine does not unnecessarily restrict access to the chuck or to the tool holder.

Yet another provision of the present invention is a new and improved machine tool having a rotatable spindle and a turret having tool-supporting surfaces which extend parallel to the spindle axis and which is indexible about an axis substantially parallel to the spindle axis and is movable for workpiece machining axially along its indexing axis in a variable length machining stroke.

Further provisions and advantages of the present invention will be apparent to those skilled in the art to which it relates from the following detailed description thereof made with reference to the accompanying drawings forming a part of this specification and in which.

Figure 1:
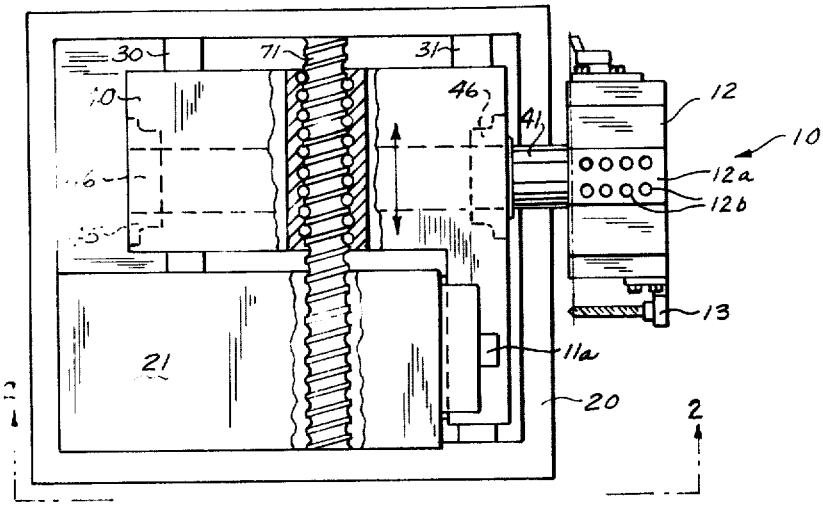
FIG. 1 is a schematic top elevational view of machine tool embodying the present invention.

The present invention provides an improved machine tool of the type which has a rotatable workpiece spindle and a tool-carrying turret offset to one side of the spindle axis and which is indexible about an axis parallel to the spindle axis and movable longitudinally of its axis of indexing. The present invention may be embodied in various forms of such machine tools but is shown in FIG. 1, by way of example, as being applied to a machine tool 10. The machine tool 10 includes a rotatable spindle 11 (FIG. 4) supported in the headstock of the machine. The spindle 11 has a workpiece gripping chuck 11a associated with it and of a conventional construction. The chuck 11a rotates with the spindle 11 and is operable to grip a workpiece to be machined, as is well known.

The machine tool 10 also includes a turret 12. The turret 12 has a plurality of tool-supporting surfaces 12a thereon and tools, shown by way of example at 13 and 14, are carried on tool-supporting surfaces of the turret. The tools carried by the turret are selectively movable to a position for working on a workpiece in the spindle by rotational indexing movement of the turret about an axis of rotation which extends parallel to the spindle axis.

The tool supporting surfaces 12a on the turret 12 lie in planes which extend parallel to the axis of indexing movement of the turret and, likewise, lie in planes which when in working position extend parallel to the axis of rotation of the spindle 11. The tool supporting surfaces 12a are adapted to receive tool supports which are secured to the surfaces 12a by means of bolts.

A machine tool bed 20 has at one end a headstock comprising the spindle housing 21 for the rotatable spindle and the various elements for effecting rotation of the spindle 11. The spindle 11 is rotated by any suitable conventional drive arrangement 29 (see FIG. 4). The aforementioned Curtis patent discloses a specific drive for effecting rotation of the spindle 11, and such disclosure is incorporated herein by reference.

The machine tool bed 20 has a pair of ways 30, 31 formed therein which extend transversely of the axis of rotation of the spindle. The way 30 is located near the left end of the machine tool bed and the way 31 is located near the right end thereof, as illustrated in FIG. 1 of the drawings, adjacent the outer end of the spindle. Both of the ways extend transversely to the spindle axis and the ways 30, 31 lie in a horizontal plane located beneath the axis of rotation of the spindle and extend rearwardly of the machine from alongside of the spindle housing.

A turret carrier 40 is carried by the ways 30, 31 and is movable along the ways transversely of the spindle axis in a direction toward and away from the axis of rotation of the spindle. The carrier 40 supports the turret 12 thereon and specifically supports a turret bar 41 which carries the turret on the outer end thereof. The turret 12 extends beyond the bed and turret bar 41 extends from the turret 12 into cooperative engagement with the carrier 40. The carrier 40 has suitable bearing support means 45, 46 thereon for supporting the turret bar 41 for movement relative to the carrier 40.

Figure 2:
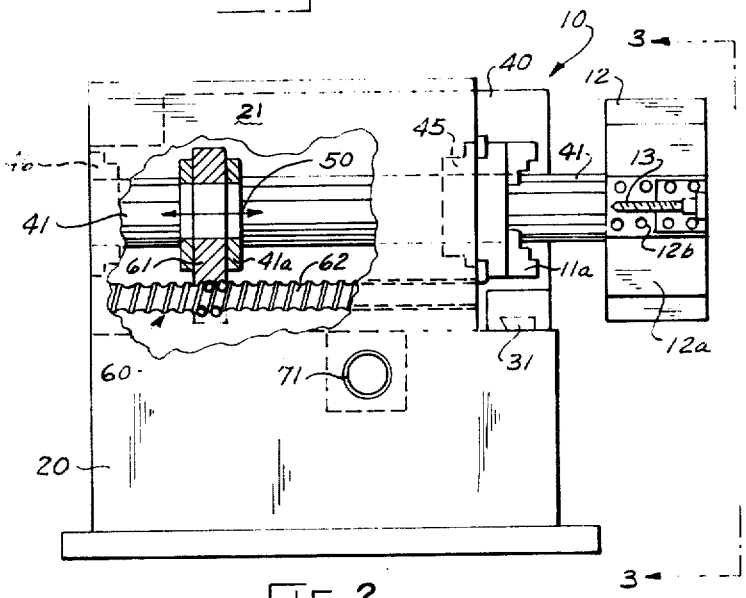
FIG. 2 is a schematic side elevational view of the machine tool of FIG. 1 looking at the machine tool as indicated by the line 2—2.
Figure 3:
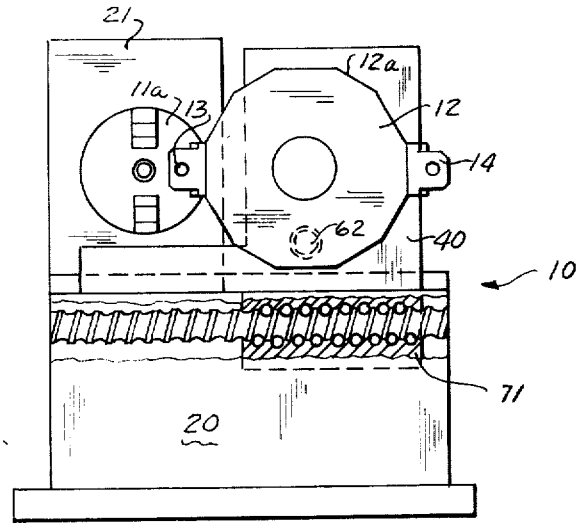
FIG. 3 is a schematic view of the machine tool of FIG. 1, looking at the machine tool of FIG. 2 as indicated by line 3—3.

The bearing support means 45, 46 comprise housing support portions located at the opposite ends of the carrier 40. The bearing support means 45, 46 support the turret bar 41 for movement in a longitudinal direction as indicated by the arrow 50 in FIG. 2, and which direction is parallel to the axis of rotation of the spindle 11. In addition, the bearing support means 45, 46 supports the turret bar for rotational indexing movement about its axis 51. Rotation of the turret about the axis 51 presents different tools carried on the various tool-supporting surfaces 12a of the turret into position for working on the workpiece. Movement of the turret in the direction of the arrow 50 longitudinally of the axis of rotation 51 causes the turret to move along the workpiece to effect a machining of the workpiece.

Various mechanisms may be utilized for effecting rotational indexing movement of the turret about the axis 51, and, in addition, various mechanisms may be utilized for effecting longitudinal movement of the turret along its axis in the direction of the arrow 50. The drawings illustrate schematically a mechanism 60 for effecting the longitudinal movement of the turret 12 along its axis in the direction of the arrow 50.

Figure 4:
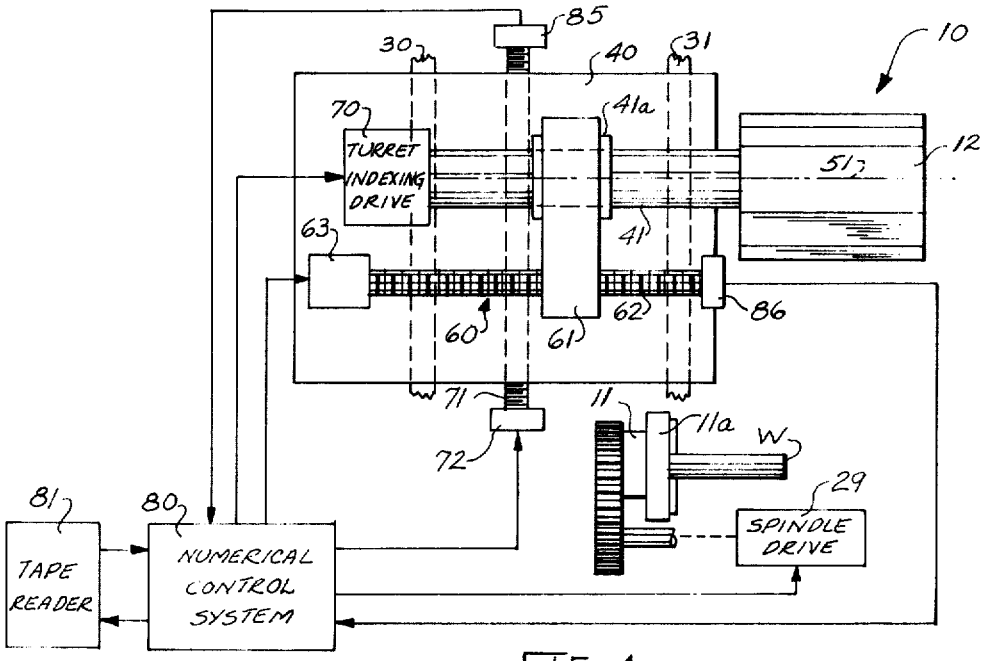
FIG. 4 is a schematic representation of the machine tool embodying the present invention and illustrating controls therefor.

The mechanism 60 is operable to effect a variable amount of movement of the turret 12 along its axis of rotation in the direction of the arrow 50. The mechanism 60 comprises a lead screw-and-nut arrangement operatively associated with the turret bar 41 to effect movement of the turret bar 41 along its axis of indexing movement. More specifically, a ball nut member 61 is mounted on the turret bar 41 and held thereon against axial movement along the turret bar 41. Suitable collars 41a hold the nut member 61 from axial movement. The turret bar 41, however, is rotatable within the ball nut. A lead screw 62 cooperates with the nut and extends therethrough and upon rotation thereof effects movement of the nut 61 and turret bar 41 in the direction of the arrow 50. This is used to effect machining movement of the turret 12 in the direction of the arrow 50. As shown in FIG. 4, the lead screw is rotated by a suitable motor 63.

In addition, a suitable motor and drive, designated 70 in FIG. 4, is associated with the turret bar 41 to effect rotational movement of the turret bar about its axis 51 upon energization of the motor. The motor and drive may be one of many suitable conventional types so as to effect the proper indexing movement of the turret bar upon energization thereof. The turret bar 41 rotates within the nut 61 during its indexing operation.

Moreover, a suitable drive mechanism is utilized for driving the carrier 40 toward and away from the axis of rotation of the spindle along ways 30, 31. FIG. 4 illustrates a conventional screw 71 driven by a motor 72 for this purpose. The lead screw 71 cooperates with a ball nut structure carried by the carrier 40 and can be operated to move the carrier 40 at rapid traverse or feed speeds.

As shown in FIG. 4, the motors 63, 72 are schematically depicted. It should be apparent, of course, that since the carrier 40 moves transverse to the spindle axis, the motor 63 and turret indexing drive must either be mounted completely on the carrier 40, or provision must be made for the movement. Such provision in the drive for the screw 62 could comprise a relatively slidable drive connection therein which permits transverse movement of the turret and screw 62 without breaking the drive to the motor 63. Similarly, while the turret indexing drive is preferably of the type disclosed in the aforesaid patent, an arrangement may be in the turret drive where a slidable drive connection could permit longitudinal movement of the bar 41 with breaking the rotard drive to the bar 41. Such connection has not been shown since such arrangements are within the domain of the skill of the art.

As shown in FIG. 4, the operation of the various drives in order to control the movement of the turret and rotation of the spindle is under the control of a numerical control system, generally designated 80 in FIG. 4. A tape reader 81 is associated with the numerical control system 80 and, in a conventional manner, a tape directs command signals to the numerical control system so as to effect a control of the operation of the motors 63, 72 and the spindle drive 29 and turret indexing drive 70. Through the operation of the tape reader 81 and the numerical control system 80, movement of the turret along its axis for machining operations, movement of the turret toward and away from the spindle through the energization of the motor 72, and turret indexing is controlled.

As is conventional in numerical control systems, a signal is returned to the numerical control system to indicate the position or movement of the machine tool elements so that the control will know when the elements have moved to the position commanded by the numerical control system. In this connection, a suitable signal means 85, such as an incremental pulse generator or a position encoder, depending on the specific control system, is associated with the lead screw 71 and returns a signal to the numerical control system 80 to indicate that the carrier 40 has been moved to the desired position commanded by the numerical control system. Likewise, a suitable signal means 86, such as an incremental pulse generator or position encoder depending on the specific control system, is associated with the lead screw 62 to indicate that the turret has been moved longitudinally to the position commanded by the numerical control system. Likewise, a suitable command signal is transmitted from the numerical control system to the tape reader to index the tape reader at the appropriate time, as is known.

In the preferred embodiment of the present machine, the carrier 40 is supported for movement toward and away from the spindle axis by bearing means in the form of ways 30, 31 to move the turret toward and away from the spindle axis. Since the turret 12 is movable toward and away from the spindle axis, the depth of cut or position of the tool may be readily changed by moving the turret transversely of the axis rather than by remounting the entire tool. In addition, a tool on the turret may be used for operations such as facing and grooving. This greatly decreases down time when the working position of the tool is to be changed to a new diameter, or because of other factors such as tool wear. Also, the tool may be mounted close to its supporting surface even through working close to the axis provided the maximum diameter of the workpiece does not cause interference problems. When the movements of the turret are numerically controlled, the depth of cut or tool position can be readily controlled from the program and change can be readily made without loss of machine time. In the absence of numerical control, the operator need merely effect the desired positioning with conventional type operator actuated controls.

It should be apparent from the above description that the turret 12 is movable not only toward and away from the spindle axis by movement of the carrier 40 but is also movable along the spindle axis in a machining operation in a variable length machining stroke. As a result, the tools carried on the surfaces 12a, which extend parallel to the spindle axis, may be positioned so that their cutting edges lie in a common plane even through the tools are to have different work strokes.

In the preferred and illustrated embodiment, the tool turret 12 is provided with bolt holes 12b at each end of the turret for receiving bolts for mounting and rigidly securing toolholders for supporting tools in position to work on the workpiece. By providing different positions along the axial length of the turret 12 to mount the toolholders, the tools can be mounted with their working edges in a common plane which is perpendicular to the axis of the spindle even through one tool is, for example, a drilling tool and another tool a turning too. Since the turret has a variable work stroke from the indexing position, the tools can be supported, from a machining standpoint, with their working edges in a common plane, to provide a machine in which machining efficiency is increased. Where the tool turret is movable through a fixed stroke, it is necessary to position the tools along the turret to cause the tools to effect the proper machining stroke when the turret is moved through its fixed stroke. Since the turret in the described application has a variable work stroke, the tools can be mounted with their cutting edges in substantially a common plane. Moreover, since the machining stroke of the tool is no longer governed by the work stroke of the turret, it is not necessary to provide dovetail ways so that the toolholder can be adjusted throughout the length of the turret. Only sufficient positions need be provided to position the cutting edges of the tools in a substantially common plane with proper support. The use of bolts and threaded holes in the turret instead of dovetails greatly facilitate the mounting of a toolholder to the turret in a rigid manner. Also, since the cutting tips of the tools are in a common plane, the operator can visually spot any misalignment of the tools or an improper location of the tool. Further, since the cutting tips of tools are in a common plane they can be readily set by a mechanical stop or button fixed to the headstock of the machine. The described construction also greatly simplifies set up of the tools since the operator always knows the proper position for the working edges of the tools and this position simplifies instructions for a numerical control since the programmer may always operate on the assumption that the tool will be in one place.

Figure 5:
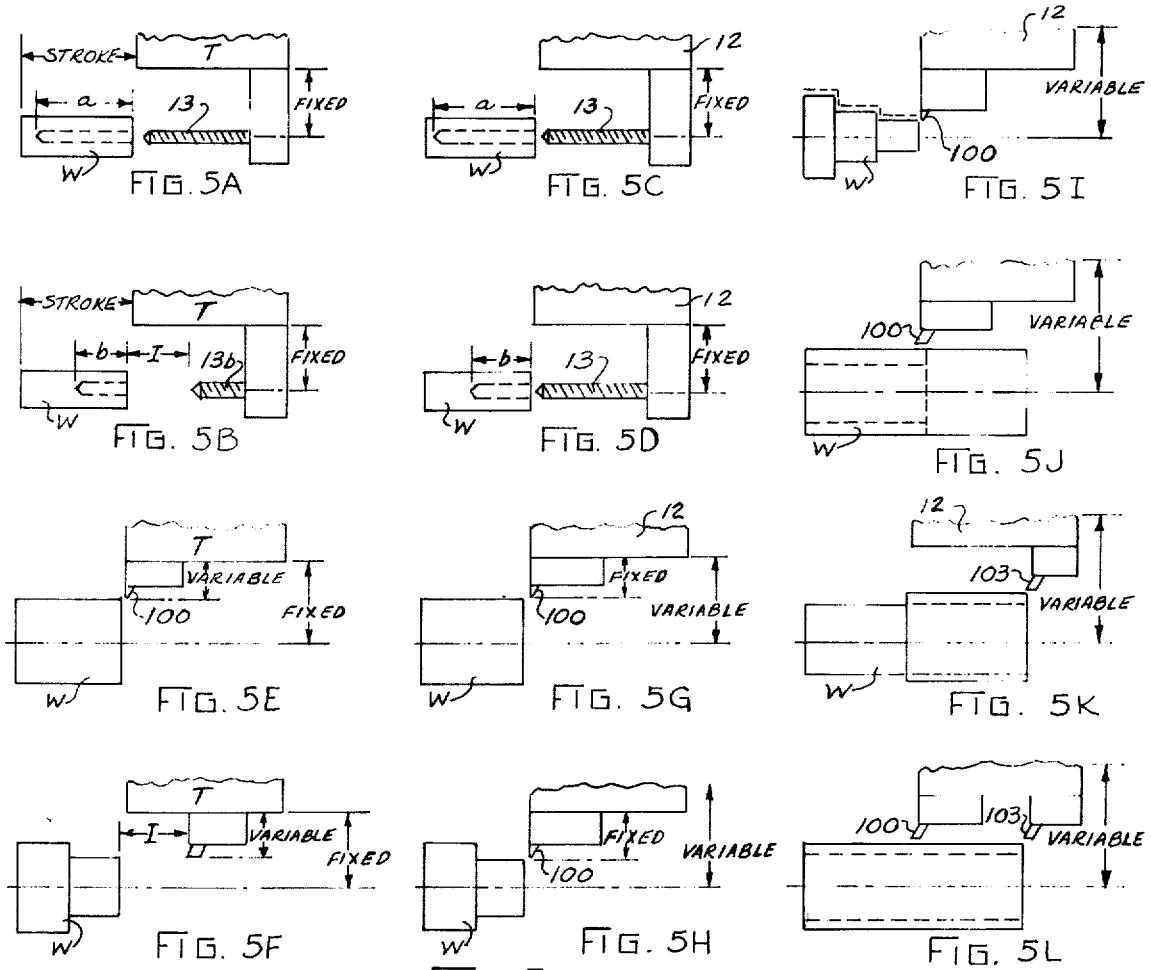
FIGS. 5A–5L are graphic illustrations showing the improved efficiency of the machine tool of the present invention as compared to a conventional machine tool.

The increased efficiency from the above-described features is best understood by references to examples, as illustrated in FIG. 5, which compare operation under the prior art machine tool as shown in the aforesaid U.S. Pat. No. 2,644,222 with the operation of a machines as described herein. In the examples, the conventional turret T and the turret 12 of the present machine are shown in their maximum retracted position. It will be recalled that the machine of the aforesaid patent has a fixed stroke for the turret T. This stroke is divided into an idling portion and a feed portion when the tool on the turret is to machine a length less than the full turret stroke.

Referring to FIGS. 5A and 5B, FIG. 5A shows a drill 13 mounted on one face of the conventional turret T with the drill having a length for drilling a hole of depth "a" in the workpiece W, the hole being the maximum depth hole that can be drilled when the turret moves through its entire work stroke. FIG. 5B shows a shorter drill 13b having a length for drilling a hole of depth "b" in the workpiece W. Since the turret T must move through its full stroke even though a hole of only depth b is to be drilled, the drill 13b is a shorter drill and its cutting point is disposed rearwardly of the cutting point of the drill 13 with respect to the forward end of the turret T. This provides idling time for the drill 13b during the first part of the feed stroke of the turret T so that when the turret completes its full-feed stroke, only a hole of depth b will have been bored in the workpiece W. The idling time has been designated by the reference character I on the drawing and is equal to the length of the fixed feed stroke less the depth of the hole to be drilled.

It will be noted from the foregoing description of FIGS. 5A and 5B that the set up of the machine is somewhat complicated by the fact that the cutting tools for the drills 13 and 13b must be located in different cutting edge planes. A cutting edge plane as used herein is a plane perpendicular to the axis of the spindle in which the cutting edge of a tool is located. Obviously, it would be simpler for the set up man if both tools could be mounted with their cutting edges in a common cutting edge plane, e.g., a plane at the front end of the turret as in the case of tool 13 in FIG. 5A. This also would simplify the work of preparing the coded instructions for the numerical control system.

FIGS. 5C and 5D illustrate the drilling or boring of holes of depth a and depth b in a machine constructed as described herein. Referring to FIG. 5C, a drill 13 for drilling a hole of depth a is mounted on the turret 12 and, as in the case of FIG. 5A, the full-feed stroke of the turret is used to drill the hole. It is not necessary, however, to mount a second drill on the turret 12 to drill a shorter hole of the same diameter to the depth b since the stroke may be terminated by the numerical control system 80 when the drill 13 has reached the proper depth. In the event that the hole to be drilled in FIG. 5D has a different diameter than the hole drilled in FIG. 5C, a drill will be required different from the drill 13. This drill will be mounted on another face of the turret and indexed into working position when required. The drill, however, will be mounted in the same manner as the drill in FIGS. 5C and 5D and will have its cutting edge in the same cutting edge plane as the drill 13. The use of a common edge cutting plane greatly simplifies set up as compared to mounting a second shorter drill as in the case of the conventional machine which requires a different cutting edge plane for drills for drilling different depth holes. The common cutting edge plane for end working and turning tools in the illustrated machine is the plane in which the cutting edge or point of the tool is located when a maximum length or depth cutting pass is to occur.

While FIGS. 5A-5D illustrate drills, it will be appreciated that other end working tools could be mounted in the conventional machine tool as illustrated in FIGS. 5A and 5B for drills 13, 13b and in the machine of the present invention as illustrated for drill 13 in FIGS. 5C and 5D. However, it should be further noted that in the case of a boring bar, the present invention also eliminates the need to change the length of the boring bit overhang with the diameter of the hole being bored. In the conventional machine and in the preferred practice of the invention, the boring bar is supported with its axis in a fixed distance from the turret face. In the conventional machine illustrated in FIGS. 5A and 5B, the diameter of the hole being bored determines the boring bit overhang. Accordingly, the machine set up man is required to make an adjustment which is dependent upon the diameter of the particular hole being bored. In the practice of the present invention, the cutter bit overhang may be kept constant and the turret moved toward or away from the spindle axis to accommodate the boring bit to different diameter openings.

Thus far, the description has proceeded with reference to end cutting tools such as drills and boring bars. FIGS. 5E and 5F illustrate the tool set up and lost idling time when turning with the conventional machine of U.S. Pat. No. 2,644,222 while FIGS. 5G and 5H illustrate the tool set up and the absence of idling time in the turret feed stroke when turning with tools mounted in a machine embodying the present invention.

Referring to FIGS. 5E and 5F, a turning tool 100 is mounted at the forward end of the conventional turret T as is in a position to effect a turning operation for the full-feed stroke of the turret. If the workpiece W illustrated in FIG. 5E is to be a stepped workpiece as illustrated in FIG. 5F, the conventional machine will have a second turning tool 102 mounted on another face of the turret for forming the reduced portion of the stepped workpiece as illustrated in FIG. 5F. The turning tool 102 must be positioned rearwardly from the forward end of the turret to provide an idling time I for the turning tool 102 while the turret T moves through the first part of its work stroke. The tool 102 is located at a position such that when the turret T has completed its work stroke, the turning tool 102 will be at the shoulder in the stepped workpiece W. Consequently, it can be seen that the machine must have lost idling time in the case of turning tool 102 as it did in the case of the drill 13b in FIG. 5B. It will be further noted that the length of the reduced portion of the workpiece W determines the idling stroke necessary for the tool 102 since the total stroke of the turret less the cutting stroke of the tool, that is, the stroke when the tool is cutting metal, is equal to the idling time.

It will be further noted that in the conventional machine illustrated in FIGS. 5E and 5F, the fixed distance between the turret face and the axis of the workpiece requires the distance of the cutting edge of the tool from the turret face to be adjusted to the position necessary to turn the desired diameter. If more than one work pass is required to turn a portion of the workpiece to a desired diameter, it is necessary to mount different cutting tools on different faces of the turret with the tools adjusted to the proper position for the successive work passes, for example, as in making deep cuts or as in rough and finished turning.

FIGS. 5G and 5H illustrate the turning of the stopped workpiece W in FIG. 5F mounted in a machine constructed in accordance with the present invention. Referring to FIG. 5G, turning tool 100 is mounted on a turret face with its cutting edge in the common cutting plane at the forward end of the turret. The turret can now be moved through its full work stroke to turn the workpiece to its maximum outside diameter. For the workpiece illustrated in FIGS. 5F and 5H, the maximum outside diameter of the workpiece is the diameter of a portion of the workpiece which is adjacent to the spindle chuck. If more than one work pass is required to turn the workpiece W to its maximum outside diameter, the turret may be moved transversely of the spindle axis under the control of the numercial control system to properly position the cutting edge to effect a turning of the necessary successive diameters, thus eliminating the need to mount additional tools on the turret for this purpose.

After the workpiece W has been turned to the desired outside diameter, the turning tool 100 can then be operated through a shorter work stroke to turn the reduced portion of the workpiece W. In this operation, the numerical control system 80 will terminate the turret feed stroke at the shoulder of the workpiece W and return the turret 12 to its retracted position after each work pass. It will be evident from the foregoing that the same tool 100 has been used to turn the outside diameter of the workpiece W and to turn the reduced portion of the workpiece W with the cutting tool 100 mounted a fixed distance from the face of the turret workpiece and without any adjustment of the tool 100 away from the forward end of the turret 12 both as was required in the conventional machine and as illustrated in FIGS. 5E and 5F.

Further, it will be clear that the tool 100 can be used to machine a three-step workpiece as illustrated in FIG. 51.

While a single tool has been used in the foregoing description of FIGS. 5G, 5H and 51, it will be clear that if for any reason a different tool is desirable for performing any portion of the turning operation, the tool can be mounted on another face with its cutting edge in the same common cutting edge plane at the forward edge of the turret.

Referring to FIG. 5J, the figure illustrates the ability of the machine of the present invention to turn a reduced portion in the workpiece which is located inwardly of the outer end of the workpiece. The turning tool 100 is mounted with its cutting edge in the common cutting plane at the forward end of the turret and, as illutrated in FIG. 5J, the turret 12 may be moved toward the axis of the spindle to move the tool into the workpiece W and begin the turning operation. The turning operation may extend for the full length of the feed stroke of the turret 12 as illustrated in FIG. 5J or it may terminate short of the full length of the stroke under the control of the numerical control system. It will be understood that the turning operation of the tool 100 in FIG. 5K may begin inwardly of the position shown in FIG. 5K. The turret 12 may be moved along the workpiece W without turning for a first portion of its feed stroke and then moved crosswise of the spindle axis to start the turning operation and moved axially for the desired length of turning.

It will be noted that FIG. 5J also illustrates a workpiece which is longer than the turret feed stroke and that the tool 100 is capable machining any portion of the workpiece W between the common cutting edge plane at the forward end of the turret and the spindle chuck.

FIG. 5K illustrates that the workpiece of FIG. 5J may be also turned by a tool mounted at the outer end of the turret 12. A tool 103 mounted at the outer end of the turret 12. A tool 103 mounted on the outer end of the turret 12 is capable of turning a portion of the workpiece W from the outer end of the workpiece to the portion which is machinable by the tool 100 mounted at the forward end of the workpiece. The tool 103 will be mounted on a different face of the turret if the machining operations are to be done at different times, but if the whole length of the workpiece is to be turned, the turning tool 103 may be mounted on the same face of the turret 12 as the turning tool 100 as is illustrated in FIG. 5L. With the tools mounted in the position illustrated in FIG. 5L, the movement of the turret 12 through its turret feed stroke will cause the tool 100 to turn the portion of the bar adjacent the chuck and the tool 103 to turn the outer portion of the bar and will effect a machining of the bar for its entire length. To this end, it is noted that the turret 12, when in its retracted position, has an outer end portion for supporting the tool 103 which is located at more than twice the distance of the turret feed stroke from the spindle chuck. It will be further understood that turning tools mounted at the outer end of the turret 12 are also mounted with their tools in a common cutting edge plane to facilitate set up and programming of the numerical control.

The present invention is useful with bar machines where bar stock is fed through a collet chuck. In the case of bar machines, the turret 12 may have a first bar pull out mechanism mounted at the forward end of the turret which is adapted to grip the bar and pull a portion from the spindle. If the machine is to perform an operation such as illustrated in FIGS. 5J–5L, a second bar pull out device can be mounted on another face of the turret in the position of tool 103 so that after the first bar pull out device has pulled the bar stock for the length of the work turret stroke, the second bar pull out device can be moved into position to grip the bar stock and pull it a second distance again corresponding to the stroke of the turret. Such bar pull out devices are illustrated in Blake application Ser. No. 45,478, filed June 11, 1970, copending herewith and assigned to the same assignee as the present invention and now U.S. Pat. No. 3,691,879.

From the foregoing illustrations, it will be clear that a machine in accordance with the present invention can be set up with the various tools required to machine various types of workpieces and that the numerical control system utilized to effect the indexing of the proper tools into working position, the proper length of the machining stroke for each tool, and the necessary crosswise movement of the turret 12 to enable different workpieces to be machined without setting up the machine for each workpiece. As explained above, the tools are preferably set with their cutting edges in a common plane at the forward end of the turret, or at the outer end of the turret when operating as in FIGS. 5K and 5L. This not only simplifies tool set up but simplifies the instructions for the numerical control system and the preparation of such instructions. Moreover, the fact that a single tool can be utilized for different length cutting passes minimizes the number of tools required for different machining operations. This enables the machine to be set up to handle a wide variety of machining jobs without the necessity of changing the set up of the tooling.

It now can be seen that a new and improved machine tool has been provided in which an indexible tool turret, which is indexible about an axis parallel to the axis of a spindle, for chucking a workpiece has tool-supporting surfaces extending longitudinally of its axis of rotation to allow tools to be mounted at various positions along the spindle axis, the machine construction being such that the turret is supported for movement transversely of the spindle axis in a manner which does not interfere with operator access to the spindle or to the turret and the turret being controlled so that it has a variable stroke thereby minimizing set up time, loss of machining time, and increasing the efficiency and accuracy of the machine tool.

The embodiment of the invention in which an exclusive property or privilege is claimed are defined as follows:

1. A machine tool comprising a frame, a rotatable member having an axis of rotation and having an outer end for supporting a workpiece to be machined for rotation with said member about said axis, an indexible tool support displaced to one side of said axis and comprising means for mounting tools on said tool support in a plurality of angular positions about an indexing axis parallel to said axis of rotation, a carrier, means supporting said tool support on said carrier for indexing movement relative to said carrier to index said tools to a position for machining a workpiece and for advance movement relative to said carrier in a work stroke parallel to said axis of rotation to effect the machining of said workpiece and for return movement, said tool support projecting outwardly of said carrier in a direction parallel to said axis of rotation to a retracted position and movable toward said carrier from said retracted position to a maximum advanced position, which positions define the maximum work stroke of said tool support, means supporting said carrier for movement toward and away from said axis to move a tool on said tool support transversely of said axis of rotation, said means supporting said carrier being disposed on said frame alongside said rotatable member and comprising a way extending transversely to said axis of rotation and alongside said rotatable member, and power driven means operatively connected to said tool support for indexing the latter and moving it through its work stroke.

2. A machine tool as defined in claim 1 wherein said means for mounting a plurality of tools comprises means for mounting turning and end-working tools on said tool supporting at each angular position and at spaced apart locations on said tool support.

3. A machine tool as defined in claim 1 wherein said tool support projects outwardly from said carrier at least approximately twice the distance of the maximum work stroke of said tool support to support an end-working tool for machining the workpiece for substantially the maximum work stroke of the tool support.

4. A machine tool as defined in claim 1 wherein said tool support has a cylindrical shaft portion fixed thereto and said carrier has bearing means receiving said shaft portion for rotation and for axial movement in the bearing means whereby said [turret] *tool support* may be indexed and moved through said work stroke, said power driven means comprising means operatively connected to said shaft portion for indexing said tool support and for moving said tool support in its work stroke.

5. An machine tool as define in claim 1 wherein said tool mounting means of said tool support comprises means for mounting a turning tool with its cutting edge in a plane to machine the outer periphery of a workpiece at least at the beginning of the work stroke with the tool support in its retracted position and for mounting an end-working tool with its cutting edge in said plane and at least a shank portion of the end-working tool extending parallel to the axis of the rotatable member for a distance at least approximately equal to the length of the maximum work stroke of said tool support whereby said end working tool is adapted to machine the workpiece inwardly from the outer end thereof for substantially the full length of the maximum work stroke as the tool support is moved through its work stroke, and said driven means comprising means for moving said tool support relative to said carrier in a direction substantially parallel to the axis of said rotatable member in different length work strokes.

6. A machine tool as defined in claim 5 wherein said means supporting said carrier comprises means for supporting said carrier for movement through a path projecting through said axis of rotation of said member.

7. A machine tool as defined in claim 5 wherein said outer end of said rotatable member is disposed adjacent one side of said frame and said tool support projects outwardly from said carrier outwardly of said one side of said frame.

8. A machine tool as defined in claim 2 wherein said tool support comprises a plurality of tool supporting surfaces arranged about said indexing axis and extending generally parallel to the axis of said rotation of said rotatable member, and said means for mounting a turning tool and an end working tool on each of said surfaces mounts the tools at positions displaced from each other approximately the distance of said maximum work storke and with the cutting edges thereof in substantially the same plane transversely of said axis of rotation.

9. A machine tool as defined in claim 8 wherein said carrier comprises a bearing means and said support comprises a portion mounted within said bearing means for indexing movement and for axial movement in said work stroke.

10. A machine tool as defined in claim 8 wherein said means supporting said carrier comprises means for supporting said carrier to move said tool support in a plane containing said axis of rotation of said member and said indexing axis.

[11. A machine tool as defined in claim 8 wherein said carrier comprises a bearing means and said support comprises a portion mounted within said bearing means for indexing movement and for axial movement in said work stroke.]

[12. A machine tool as defined in claim 11 wherein said means supporting said carrier comprises means supporting said carrier for movement in a path projecting through said axis of rotation.]

[13. A machine tool as defined as in claim 11 wherein said outer end of said rotatable member is disposed adjacent one side of same frame and said tool support projects outwardly from said carrier outwardly of said one side of said frame.]

14. A machine tool as defined in claim 1 wherein said way extends parallel to a line perpendicular to and intersecting the axis of said rotatable member and supporting said carrier for movement along a path projecting through said axis of rotation.

15. A machine tool as defined in claim 14 wherein said way is disposed inwardly of the plane of said outer end of said rotatable member.

16. A machine tool as defined in claim 1 wherein said outer end of said rotatable member is disposed adjacent one side of said frame and said tool support projects outwardly from said carrier outwardly of said one side of said frame.

17. A machine tool as defined in claim 4 wherein said way is disposed adjacent said outer end of said rotatable member and said means supporting said carrier further comprising a second way extending transversely of said axis of rotation and which is disposed on said frame inwardly of said outer end of said rotatable member, said frame having a side extending transversely of said axis of rotation adjacent said outer end of said rotatable member and said tool [turret] *support* projecting outwardly from said carrier beyond said side.

*18. A machine tool comprising a frame, a rotatable member having an axis of rotation and having an outer end for supporting a workpiece to be machined for rotation with said member about said axis, an indexible tool turret displaced to one side of said axis and comprising means for mounting tools on said turret in a plurality of angular positions about an indexing axis parallel to said axis of rotation, a carrier, turret support means supported by said carrier and projecting outwardly of said carrier for supporting said turret for indexing movement relative to said carrier to index said tools to a position for machining a workpiece and providing for advance movement of said turret relative to said carrier in a work stroke parallel to said axis of rotation to effect the machining of said workpiece and for return movement, said turret support means projecting outwardly of said carrier in a direction parallel to said axis of rotation to a retracted position and movable toward said carrier from said retracted position to a maximum advanced position, which positions define the maximum work stroke of said turret, means supporting said carrier for movement toward and away from said axis to move a tool on said turret transversely of said axis of rotation, said means supporting said carrier being disposed on said frame alongside said rotatable member and comprising a way extending transversely to said axis of rotation and alongside said rotatable member, and power means for effecting indexing movement of said turret for indexing the latter and for moving it through its work stroke comprising means for moving said turret through different length work strokes during machining operations.*

*19. A machine tool as defined in claim 18 wherein said turret has a length measured along said indexing axis which is at least as great as the distance of the maximum work stroke of said turret to support an end-working tool for machining the workpiece for substantially the work stroke of the turret and said means for mounting tools on said turret comprises means for mounting turning tools and end-working tools on said turret at spaced apart locations along said indexing axis whereby the cutting edges thereof may be positioned in a common plane extending transversely of said axis of rotation.*

*20. A machine tool comprising a frame, a rotatable member having an axis of rotation and having an outer end for supporting a workpiece to be machined for rotation with said member about said axis, an indexible tool turret displaced to one side of said axis and comprising means for mounting tools on said turret in a plurality of angular positions about an indexing axis parallel to said axis of rotation, a carrier, turret support means supported by said carrier and projecting outwardly of said carrier for supporting said turret for indexing movement relative to said carrier to index said tools to a position for machining a workpiece and for providing for advance movement of said turret relative to said carrier in a work stroke parallel to said axis of rotation to effect the machining of said workpiece and for return movement, said turret support means projecting outwardly of said carrier in a direction parallel to said axis of rotation, said turret having a maximum retracted position away from the spindle and movable toward said spindle from said retracted position to a maximum advanced position, which positions define the maximum work stroke of said turret, means supporting said carrier on said frame for movement toward and away from said axis of rotation to move a tool on said turret transversely of said axis of rotation, and power means for effecting indexing movement of said turret for indexing the latter and for moving it through its work stroke comprising means for moving said turret through different length work strokes during machining operations, said turret having an axial length which is at least approximately equal to the distance of the maximum work stroke of said turret for supporting an end-working tool for effecting machining of the workpiece for substantially the maximum work stroke of the turret and for supporting a turning tool for effecting machining of the workpiece for substantially the maximum work stroke of the turret and said means for mounting tools on said turret comprising means for mounting turning tools and end-working tools on said turret at spaced apart locations along said indexing axis whereby the cutting edges of the tools may be positioned in a common plane extending transversely of said axis of rotation to effect machining by the respective tools for substantially the maximum work stroke of said turret.*

*21. A machine tool as defined in claim 18 wherein said carrier comprises a bearing means and said turret support means comprises a portion mounted within said bearing means for indexing movement and for axial movement in said work stroke.*

*22. A machine tool as defined in claim 18 wherein said means supporting said carrier comprises means supporting said carrier for movement in a path projecting through said axis of rotation.*

*23. A machine tool as defined in claim 18 wherein said outer end of said rotatable member is disposed adjacent one side of said frame and said turret support means projects outwardly from said carrier outwardly of said one side of said frame.*

* * * * *

UNITED STATES PATENT AND TRADEMARK OFFICE

CERTIFICATE OF CORRECTION

PATENT NO. : Re 29,612

DATED : April 18, 1978

INVENTOR(S) : Fullerton, Baxter T.

It is certified that error appears in the above-identified patent and that said Letters Patent are hereby corrected as shown below:

Column 14, lines 11 and 12, delete "spindle", each occurrence, and insert --rotatable member--.

Signed and Sealed this

*Fifth* Day of *June 1979*

[SEAL]

*Attest:*

RUTH C. MASON
*Attesting Officer*

DONALD W. BANNER
*Commissioner of Patents and Trademarks*